United States Patent Office 3,327,033
Patented June 20, 1967

3,327,033
PROCESS FOR TREATING AMORPHOUS POLY-
CARBONATE FILM WITH SOLVENT VAPOR
Otto Koch, Cologne-Stammheim, Arthur Prietzschk and Alfred Reichle, Dormagen, and Hieronymus Zygan, Leverkusen, Germany, assignors to Farbenfabriken Bayer Aktiengesellschaft, Leverkusen, Germany, a German corporation
No Drawing. Filed July 18, 1963, Ser. No. 296,087
Claims priority, application Germany, July 31, 1962,
F 37,467
8 Claims. (Cl. 264—83)

This invention relates to a process for the production of thermoplastic films and more specifically to a novel process for the production of high molecular weight polycarbonate films.

It is known to improve the physical properties of thermoplastic films by various stretching operations. It is correspondingly also known that polycarbonate films subjected to stretching generally have higher tensile strength, higher elasticity modulus, higher tearing strength, smoother surfaces and higher transparency than the unstretched films. In order to stretch polycarbonate films, however, it is necessary that the film to be stretched be at least partially crystallized. Partially crystalline polycarbonate films can easily be produced by casting methods, however, films produced by extruding procedures are always amorphous or substantially non-crystalline. Consequently, extruded films, if they are to be used in the production of high-quality stretched films, must previously be made at least partially crystalline.

It is also known to increase the crystallinity of most synthetic plastic films by exposing or otherwise contacting the film with swelling agents. The formation of a crystallized structure is facilitated by the initial swelling or softening of the film. During this treatment, the strength of the amorphous films decreases, but subsequently increases again with the resulting crystallization and finally exceeds the initial strength. The swelled films generally have a mechanical strength rendering them readily adaptable to this swelling procedure without any apparent difficulties.

Polycarbonate films, however, unlike most other synthetic plastic films may not be successfully treated with swelling agents to increase their crystallinity. If polycarbonate films are introduced into swelling or softening agents, the strength decreases to such a strong degree that the film can no longer be handled in any way. In any case, there are great difficulties connected with the technical use of this process, especially when endless webs of film are continuously treated. Furthermore, a tension corrosion is set up with all polycarbonate films when they are treated with liquid softening agents. The films introduced thereinto always show certain internal tensions and external tensions due to the stretching in a processing machine. This becomes apparent from the formation of a large number of cracks in the film during the treatment with the swelling agents and in many cases the film breaks up into relatively small fragments. In addition, the polycarbonate films and film fragments obtained by the prior known process using the above-noted softening procedure are brittle and non-transparent because of relatively strong clouding which is set up. Also the resulting surface of the film is rough.

It is, therefore, an object of this invention to provide a process for producing polycarbonate films of improved physical properties. Another object of this invention is to provide a process for the production of crystalline polycarbonate films which have been previously extruded. A further object of this invention is to provide a process for producing a stretchable-extruded polycarbonate film. A still further object of this invention is to provide a method for at least partially crystallizing an extruded polycarbonate film. Still a further object is to provide a method for crystallizing a polycarbonate film without the heretofore resulting impairment of physical properties. A yet still further object of this invention is to provide polycarbonate films which are partially crystalline, are stretchable and have been produced initially by extrusion.

The foregoing objects and others which will become apparent from the following description are accomplished, generally speaking, by providing a process for at least partially crystallizing an extruded polycarbonate film which comprises contacting said extruded film while under at least some tension with vapors of a polycarbonate solvent. The film as a result of being contacted with said vapors while under tension is deformed to from about 80% to about 120% of its original dimension or dimensions. The film, therefore, may be deformed longitudinally and/or laterally so that it shrinks by up to about 10% or is stretched by up to 10%. These films so treated may then be stretched successfully in later operations by known stretching methods, for example, similar to those discussed in U.S. Patents 3,007,204, 3,005,236 and 2,964,797.

It has thus been found that extruded films of linear polycarbonates of high molecular weight can be crystallized in a technically simple manner if extruded amorphous films of linear polycarbonates of high molecular weight are first of all treated with vapors of organic solvent, are thereafter dried and the films are kept throughout the entire process under such a tension that they shrink by up to about 10% or are stretched by up to about 10%.

It is considered as extremely surprising that the polycarbonate films undergoing the treatment according to the invention always maintain a certain strength so that also it is readily possible for the process to be carried out continuously. It is also surprising that no tension corrosion is set up with the films, the film is not brittle and has a smooth surface with only slight clouding, which disappears again on stretching.

By extruded films, there are understood in conformity with usual technical language, those films which are formed from the melt with the aid of slit nozzles. The thickness of the films is between approximately 0.05 and 2.0 mm.

The extruded films of polycarbonates are always amorphous. In accordance with the invention, there is understood thereby that the reflux width of 8.7° reflex is at least 2.5° (half value width). Copper $K_\alpha$ radiation is used when determining the reflux width.

Plasticizers such as butyl phthalate, dibutyl phthalate and dimethyl phthalate can also be added to the polycarbonates prior to the shaping. Films which contain such plasticizers can be crystallized in a particularly simple manner when using the process according to the invention.

Any suitable film-forming polycarbonate may be used in making the film. The films generally consist of linear polycarbonates of high molecular weight, and the molecular weight of such polycarbonates can fluctuate within very wide limits but is advantageously between 20,000 and 200,000. Typical polycarbonates together with those discussed in U.S. Patents 3,028,365; 3,043,800 and 3,043,802 which may be used are polycarbonates of 2,2-(4,4'-dihydroxy diphenyl)-propane, 2,2-(4,4'-dihydroxy-3,3',5,5'-tetrachloro diphenyl)-propane, 2,2-(4,4'-dihydroxy-3,3'-dichlorodiphenyl)-propane and 2,2-(4,4'-dihydroxy diphenyl)-butane, or copolymers of 2,2-(4,4'-dihydroxy diphenyl)-propane and 0.5 to 10 mol percent of another dihydroxy diaryl alkane and/or another aromatic, aliphatic or cycloaliphatic dihydroxy compound, such as 4,4'-dihydroxy diphenyl methane, 1,1-(4,4'-dihydroxy diphenyl)-cyclohexane, 1,1-(4,4'-dihydroxy diphenyl)-ethane, 4,4'-dihydroxy diphenyl sulphone, 4,4'-dihydroxy diphenyl ether, 4,4'-dihydroxy diphenyl, 2,6-dihydroxy naphthalene, hydroquinone, resorcinol, hexane-1,6-diol, cyclohexane-1,4-diol, p-xylylene glycol and 2,2-(4,4'-dihydroxy ethoxy diphenyl)-propane and finally mixed polycarbonates of 4,4'-dihydroxy diphenyl methane and other dihydroxy diaryl alkanes and/or other aromatic, aliphatic or cycloaliphatic dihydroxy compounds like those mentioned above in a wide mixing range.

As organic solvents, it is possible to use both those solvents which only cause the polycarbonates to soften and those which completely dissolve the polycarbonates. Any suitable solvents may be used in the present process; typical solvents are acetone, methylene chloride, acetonitrile, chloroform, tetrachloro ethane, ethylene dichloride, chlorobenzene, dichlorobenzene, trichloroethane, dichloroethane, thiophene, dioxane, benzene, xylene, esters such as acetic acid ethyl ester and acetic acid butyl ester and ethers such as tetrahydrofuran.

The solvents are caused to act in vapor form on the polycarbonate films, the temperatures being between approximately about $-10°$ C. and about $+150°$ C. Instead of pure solvents, it is also possible to use solvent mixtures, such as acetone and acetonitrile or methylene chloride and chloroform, or any other mixtures of the above solvents.

The process according to the invention is carried out in such a way that the dimensions of the film in the longitudinal and transverse directions are only slightly modified with the solvent vapor treatment and with the drying. Any possible shrinkage should not be more than 20% and advantageously not more than 5%. Any possible elongation should not exceed 10%, advantageously 5%. The alterations in the dimensions apply both for the transverse and longitudinal directions of the film.

The drying of the film is carried out in the usual manner, for example, with the aid of hot gases such as air, by irradiation or by means of hot rollers over which the film travels.

In the drying of the film, the most expedient temperature is not dependent only on the boiling point of the solvent, but also on the degree of crystallization of the film. If the film is completely crystallized, it is possible to use drying temperatures which are above the boiling point of the solvent. However, if the film is only partially crystallized, it is expedient to use drying temperatures below the boiling point of the solvent. With drying temperatures above the boiling point, bubble formation can occur in the films.

The drying of the films can thus be carried out in a wide temperature range but it is advantageous to effect the drying at temperatures between about 20° C. and 200° C.

The film which can be obtained according to the invention has a more or less high crystallinity, depending on the type of treatment. The reflex width of the 8.7°-reflex is below 1.5° (half value width, copper $K_\alpha$-rediation). This reflex width is advantageously between 0.6° and 1.5°.

The treatment of the films in accordance with the invention with solvent vapor and also the subsequent drying can be carried out by all methods known for this purpose in the art. Some indications thereof are hereinafter given and particularly desirable embodiments for the conduction of the process are discussed.

The vapor treatment can be carried out intermittently or continuously. When working intermittently, the film can for example, be tensioned in a frame. In this case, there can be no change in length of the film longitudinally or transversely.

When operating continuously, the film, is for example, guided with clip devices through the vapor chamber. The conditions as regards the change in length can be maintained by means of a pair of supply rollers and a pair of withdrawal rollers. In similar manner, webs of film which are strengthened at the edges can be pulled through slide rails. The film can, for example, be somewhat stretched or shrunk by regulating the spacing of the two slide rails.

For supplying the solvent vapor chamber with solvent vapor, it is preferred to use a solvent evaporator and possibly to operate on a cyclic principle.

The slide rails for the edge-reinforced films can also be replaced by pairs of idling rollers.

The process according to the invention can also be carried out by softening the films at a relatively low temperature, the temperature then being raised to accelerate the crystallization. If the films are exposed during the crystallizing process or even subsequently thereto to squeezing or pressure forces, the transparency of the films is thereby improved. For this purpose, the film is conducted through pairs of rollers, such as pairs of wringing rollers or calenders.

Similarly good results as regards transparency and surface smoothness can also be produced if the polycarbonate films are guided during their vapor treatment over a plurality of rollers arranged closely adjacent and parallel to one another, the film alternatively resting its upper surface or bottom surface on a roller. The bending stress which is thereby set up promotes the crystallization.

Because of their high crystallinity, the polycarbonate films which can be obtained according to the invention are particularly suitable for the production of films having valuable properties by a stretching process.

The following examples will further define the present invention; parts are by weight unless otherwise specified.

*Example 1*

Three extruded polycarbonate films (thickness about 0.4 mm.) of a polycarbonate of 2,2-(4,4'-dihydroxy diphenyl)propane of relative viscosity about 1.50 (measured in about 0.5% solution in methylene chloride at about 20° C.) are stretched in three frames and subjected at room temperature to an almost saturated acetone, methylene chloride and chloroform vapor atmosphere, respectively. The films then start to soften and crystallize after a few hours, calculated from the commencement of the treatment within a comparatively short time which can be recognized from a decrease in the X-ray reflex width $\vartheta=8.8°$ (Cu $K_\alpha$-radiation) and a very slight clouding of the film. The reflex width is reduced from $\Delta\vartheta=2.5°$ to about $\Delta\vartheta=1°$ and below, depending on the duration of the treatment with solvent vapor. After the solvent treatment, the films are dried at about 50° C. The longitudinal and transverse dimensions of the film remain unchanged.

*Example 2*

Extruded polycarbonate films (thickness about 0.4 mm.) of a polycarbonate of 2,2 - (4,4' - dihydroxy diphenyl)-propane of the relative viscosity about 1.50 (measured in 0.5% solution in methylene chloride at about 20° C.) are stretched in a frame and is subjected at about 5° C. and at about 50° C. to an almost saturated acetone, methylene chloride and chloroform vapor atmosphere. The films then crystallize through more slowly at low temperature and more quickly at high temperature than at room temperature, the slight clouding at lower temperature, related to like crystallinity, being less. The increase in the crystallinity is followed as in Example 1 on the basis of the reduced reflex width. After the treatment with solvent, the films are dried at about 30° C. with warm air. The length and width of the film obtained are unchanged.

*Example 3*

As described in Examples 1 and 2, films are softened in solvent vapor and, when a certain degree of softening is reached, the crystallization is initiated by raising the vapor temperature, whereby also the crystallization times are shortened.

*Example 4*

The experiments described in Examples 1 to 3 are repeated with polycarbonate films. However, before the shaping, dimethyl phthalate is added to the polycarbonate in a quantity of about 3% to serve as plasticizers. The addition of plasticizer causes a substantial shortening of the crystallization time.

*Example 5*

A continuous film web (about 0.4 mm. thick and about 300 mm. wide) consisting of the polycarbonate of 2,2-(4,4′-dihydroxy diphenyl)-propane with the relative viscosity about 1.32 (measured in 0.5% solution in methylene chloride at about 20° C.) is tensioned in a wide tentering frame of known design with guideways arranged substantially parallel and conveyed with a feeding and withdrawal roll stand at about 20 to 50° C. through an acetone vapor treatment path. The solvent vapors are supplied by a cyclic process by means of a solvent evaporator. Following the vapor treatment zone, the film is dried in another zone at about 60° C. air temperature. The film can in this way be continuously crystallized with the same results as in Examples 1 and 2. The films are shrunk by about 5% in the longitudinal direction and by about 2% in the transverse direction.

*Example 6*

The process according to Example 5 is repeated, but the films run over a plurality of rollers arranged closely adjacent one another, the film alternately contacting the roller with the upper surface and the lower surface. In this way, films are obtained which have a greater transparency with equal crystallinity.

It is to be understood that this invention is not limited by the examples, but that any of the compositions mentioned above as typical for use in the present invention may be used in place of those set forth in the examples with similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In a process for preparing a substantially clear, transparent polycarbonate film by at least partially crystallizing an amorphous polycarbonate film, the improvement which comprises contacting the amorphous film with vapors of a polycarbonate solvent while the film is deformed under tension to from about 90% to about 110% of its original dimensions.

2. The process of claim 1 wherein the film is stretched in a transverse direction.

3. The process of claim 1 wherein the film is stretched in a longitudinal and transverse direction.

4. The process of claim 1 wherein the polycarbonate film is contacted with vapors at a temperature of from about −10° C. to about 150° C.

5. The process of claim 1 wherein said film comprises a 2,2-bis-(4-hydroxy phenyl)-propane polycarbonate.

6. The process of claim 1 wherein said film is maintained in contact with said vapors while under tension.

7. The process of claim 1 wherein the solvent-treated film is dried and subsequently stretched to the desired size.

8. The process of claim 1 wherein the film is stretched in a longitudinal direction.

References Cited

UNITED STATES PATENTS

| 2,856,638 | 10/1958 | Schulken et al. | 264—340 |
| 3,005,236 | 10/1961 | Reichle et al. | 264—290 |
| 3,088,794 | 5/1963 | Bonner | 264—343 |
| 3,214,500 | 10/1965 | Maerov et al. | 264—210 |

OTHER REFERENCES

"Polycarbonates," Christopher et al., Reinhold Publishing Corporation, 1962.

ALEXANDER H. BRODMERKEL, *Primary Examiner.*

ROBERT F. WHITE, *Examiner.*

J. H. WOO, *Assistant Examiner.*